US008542892B2

(12) United States Patent
Kovalski

(10) Patent No.: US 8,542,892 B2
(45) Date of Patent: Sep. 24, 2013

(54) METHOD AND APPARATUS FOR COMPENSATING FOR MOTION IN AN IMAGED OBJECT

(75) Inventor: Gil Kovalski, Haifa (IL)

(73) Assignee: General Electric Company, Schenectady, NY (US)

( * ) Notice: Subject to any disclaimer, the term of this patent is extended or adjusted under 35 U.S.C. 154(b) by 993 days.

(21) Appl. No.: 12/613,384

(22) Filed: Nov. 5, 2009

(65) Prior Publication Data

US 2011/0103664 A1   May 5, 2011

(51) Int. Cl.
*G06K 9/00* (2006.01)
(52) U.S. Cl.
USPC ............ 382/128; 382/131; 378/4; 600/436
(58) Field of Classification Search
USPC ............ 382/128, 131; 250/252.1, 363.04; 378/4; 600/436
See application file for complete search history.

(56) References Cited

U.S. PATENT DOCUMENTS

| | | | |
|---|---|---|---|
| 6,529,617 B1 * | 3/2003 | Prokoski | 382/128 |
| 6,839,661 B2 * | 1/2005 | Costa et al. | 702/189 |
| 7,109,489 B2 | 9/2006 | Shwartz et al. | |
| 7,158,823 B2 * | 1/2007 | Hawkins | 600/436 |
| 7,220,961 B2 * | 5/2007 | Chapman | 250/252.1 |
| 7,327,822 B2 * | 2/2008 | Sauer et al. | 378/4 |
| 7,408,163 B2 * | 8/2008 | Hefetz | 250/363.04 |
| 7,444,011 B2 * | 10/2008 | Pan et al. | 382/131 |
| 7,655,913 B2 * | 2/2010 | Malmin | 250/363.03 |
| 7,805,181 B2 * | 9/2010 | Breeuwer | 600/419 |
| 7,885,371 B2 * | 2/2011 | Thibault et al. | 378/4 |
| 8,135,186 B2 * | 3/2012 | Bouman et al. | 382/128 |
| 8,233,682 B2 * | 7/2012 | Fessler et al. | 382/128 |
| 2011/0152679 A1 * | 6/2011 | Morag | 600/431 |

FOREIGN PATENT DOCUMENTS

WO   WO 02065398 A1 *   8/2002
WO   WO 2008103435 A1 *   8/2008

OTHER PUBLICATIONS

"Correction of Heart Motion Due to Respiration in Clinical Myocardial Perfusion SPECT Scans Using Respiratory Gating" Gil Kovalski, Ora Israel, Zohar Keidar, Alex Frenkel, Jonathan Sachs, and Haim Azhari, Faculty of Biomedical Engineering, the journal of nuclear medicine, vol. 48, No. 4, Apr. 2007.*
Dialog search, Jun. 12, 2013.*
Google patents search, Jun. 12, 2013.*
Correction of heart motion due to respiration in clinical myocardial perfusion SPECT scans using respiratory gating; Gil Kovalski, Ora Israel, Zohar Keidar, Alex Frenkel, Jonathan Sachs, Naim Ahari; The Journal of nuclear medicine, Vo. 48, No. 4, Apr. 2007.*

(Continued)

*Primary Examiner* — Dilek B Cobanoglu
(74) *Attorney, Agent, or Firm* — The Small Patent Law Group; Dean D. Small

(57) ABSTRACT

A method and apparatus for compensating for motion in an imaged object are provided. The method includes obtaining nuclear medicine (NM) image data for an object acquired from an NM imaging system, wherein the NM image data includes single photon emission computed tomography (SPECT) image data. The method further includes performing resolution recovery on the NM image data. The method also includes reconstructing the resolution recovered NM image data into a plurality of subsets and morphing the reconstructed NM image data in at least one of the plurality of subsets. The method additionally includes normalizing the NM image data based on a magnitude of the morphing and summing the NM image data to generate an NM image compensated for motion of the object.

26 Claims, 4 Drawing Sheets

(56) References Cited

OTHER PUBLICATIONS

Kovalski, et al., Dual "motion-frozen heart" combining respiration and contraction compensation in clinical myocardial perfusion SPECT Imaging, Journal of Nuclear Cardiology, Issue vol. 16, No. 3, Jun. 2009, (9) pgs.

Fred L. Bookstein, Principal Warps: Thin-Plate Splines and the Decomposition of Deformations, IEEE Transactions on Pattern Analysis and Machine Intelligence, vol. 11, No. 6, Jun. 1989, (19) pgs.

Piotr J. Slomka, et al., "Motion-Frozen" Display and Quantification of Myocardial Perfusion, The Journal of Nuclear Medicine, vol. 45, No. 7, Jul. 2004, (7) pgs.

\* cited by examiner

METHOD AND APPARATUS FOR COMPENSATING FOR MOTION IN AN IMAGED OBJECT

BACKGROUND OF THE INVENTION

The subject matter disclosed herein relates generally to diagnostic imaging systems, and more particularly to nuclear medicine (NM) imaging systems, especially Single Photon Emission Computed Tomography (SPECT) imaging systems and methods for compensating for motion in an imaged object.

Nuclear medicine (NM) imaging systems, for example, SPECT imaging systems, use several image detectors to acquire imaging data, such as gamma ray or photon imaging data. The image detectors may be gamma cameras or radiation detectors that acquire two-dimensional views of three-dimensional distributions of radionuclides emitted from an object (e.g., a patient) being imaged. The image detectors acquire a plurality of two-dimensional images (also referred to as projections) to create a multi-dimensional image of a structure of interest or photons transmitted from the object. In SPECT systems, 40, 60 or more projections may be acquired, which are then reconstructed to generate a three-dimensional dataset. Backprojection and reconstruction algorithms may then use information about the physical construction and properties of the imaging system to reconstruct the dataset into three-dimensional and/or four-dimensional representations.

In NM imaging, for example, during cardiac SPECT imaging, the heart contracts and relaxes. This motion of the heart is a significant cause of myocardial blurring in reconstructed images. Breathing and other random patient motion (e.g., movement of a hand or arm) also contributes to blurring in the images. Additionally, collimator response causes blurring, which is dependent on the distance from the collimator.

As a result of the blurring of the images, identification of defects, for example, in the radioisotope distribution within the heart are more difficult to identify. As a result of this difficulty, extra diagnostic testing may be needed and misdiagnosis is possible.

BRIEF DESCRIPTION OF THE INVENTION

In accordance with various embodiments, a method for compensating for motion in an imaged object is provided. The method includes obtaining nuclear medicine (NM) image data for an object acquired from an NM imaging system, wherein the NM image data includes single photon emission computed tomography (SPECT) image data. The method further includes performing resolution recovery on the NM image data. The method also includes reconstructing the resolution recovered NM image data into a plurality of subsets and morphing the reconstructed NM image data in at least one of the plurality of subsets. The method additionally includes normalizing the NM image data based on a magnitude of the morphing and summing the NM image data to generate an NM image compensated for motion of the object.

In accordance with other embodiments, a method for reducing blurring in nuclear medicine (NM) cardiac images is provided. The method includes obtaining gated NM cardiac images including photon count information and morphing a count distribution of a plurality of phases of the gated NM cardiac images into a location of a selected one of the plurality of phases. The method further includes applying a normalization factor to the morphed NM cardiac images. The normalization factor is based on an amount of heart contraction.

The method also includes summing the normalized gated NM cardiac images to generate an image of a heart having reduced blurring.

In accordance with yet other embodiments, an imaging system is provided that includes a gantry having at least one imaging detector configured to acquire nuclear medicine (NM) image data of a patient and an electrocardiogram (ECG) processor module configured to acquired ECG gating information corresponding to the acquired NM image data of the patient. The imaging system further includes an image motion compensation module configured to morph the NM image data for each of a plurality of gates using resolution recovered image data and normalize the NM image data based on a magnitude of the morphing.

DETAILED DESCRIPTION OF THE INVENTION

Figure 1:
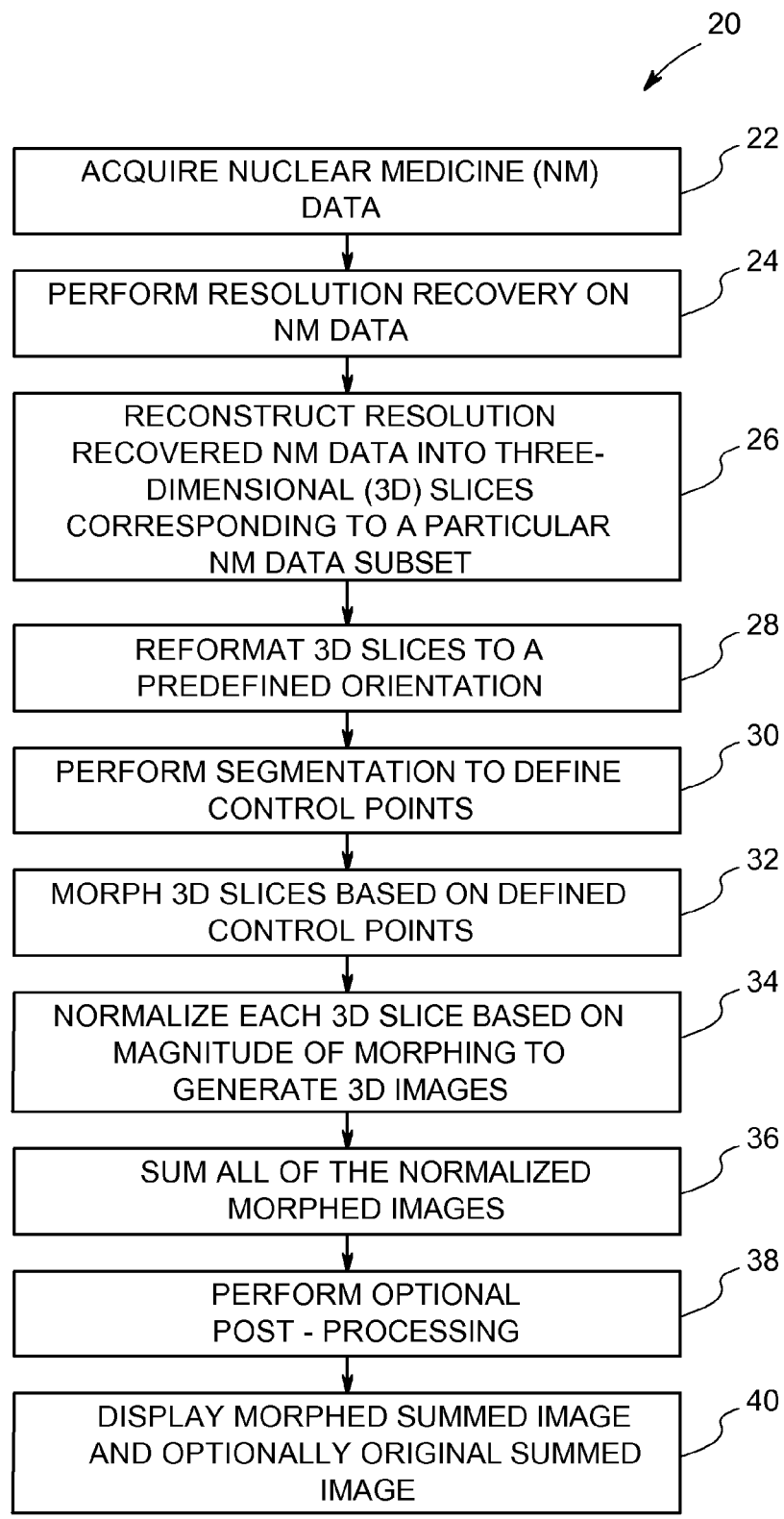
FIG. 1 is a flowchart of a method for compensating for motion in an imaged object in accordance with various embodiments.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Also as used herein, the phrase "reconstructing an image" is not intended to exclude embodiments in which data representing an image is generated, but a viewable image is not. Therefore, as used herein the term "image" broadly refers to both viewable images and data representing a viewable image. However, many embodiments generate, or are configured to generate, at least one viewable image.

Various embodiments provide methods and systems for compensating for motion in an imaged object to reduce blurring in images generated therefrom, particularly diagnostic nuclear medicine (NM) images, which in various embodiments includes images acquired and generated by Single Photon Emission Computed Tomography (SPECT) imaging systems. In cardiac imaging, the various embodiments reduce blurring while keeping photon counting noise low by summing data from all phases of the heart cycle, which also includes morphing the counts of the three-dimensional (3D) distribution of all the phases into the location of a selected one of the phases (e.g., the stationary diastole). A technical effect of at least one embodiment is that resulting images have higher photon counts, lower noise and higher spatial resolution, which allows for improved identification of defects, for example, in the radioisotope distribution of the heart.

It should be noted that although various embodiments may be described in connection with NM cardiac imaging, for example, myocardial perfusion imaging (MPI) using a SPECT imaging system, the various embodiments may be implemented in connection with different types of imaging and imaging different objects or organs. For example, although the methods described herein may relate generally to compensating for motion in an imaged object to reduce blurring in images acquired by diagnostic imaging systems that perform Nuclear Medicine (NM) imaging, for example, SPECT imaging, such as MPI SPECT imaging, the various embodiments may be implemented in other imaging technologies, for example, in single modality or dual-modality imaging systems.

More particularly, various embodiments include a method 20 illustrated in FIG. 1 for compensating for motion in an imaged object to reduce blurring in images generated therefrom, particularly in NM images. For example, in cardiac NM imaging, the method 20 reduces image blurring by correcting or compensating for cardiac motion during the imaging process. Specifically, at 22 NM data is acquired, which may include acquisition using an NM imaging system or obtaining stored NM data previously acquired by an NM imaging system. In various embodiments, the acquired data includes spatial and temporal information for each of a plurality of detected photons, which generally corresponds to a plurality of registered photon counts (also referred to herein as counts).

Figure 2:
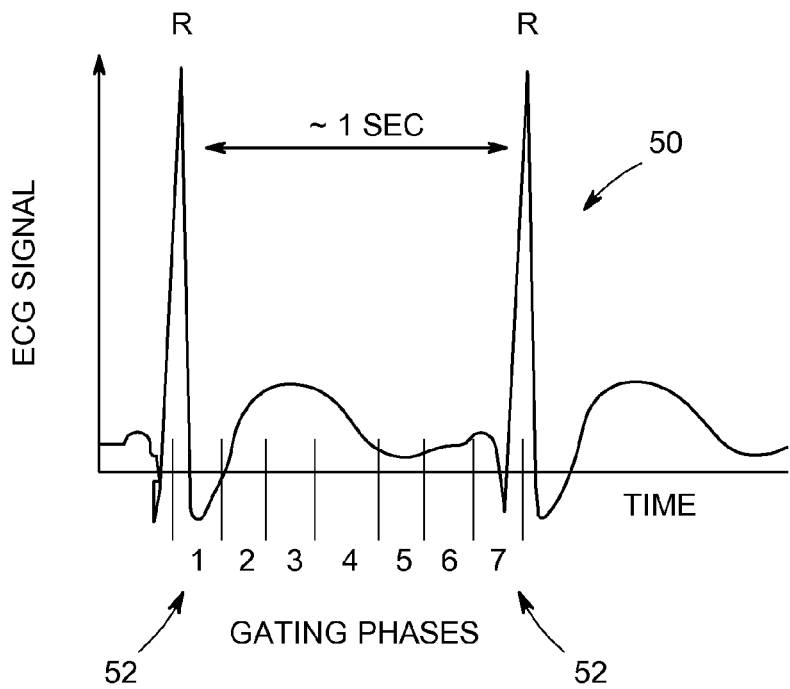
FIG. 2 is a diagram of electrocardiogram (ECG) signal over time that may be used in accordance with various embodiments.

In cardiac applications, the NM data is often ordered in projections for each of a plurality of gates that are used to divide the cardiac cycle using, for example, an electrocardiogram (ECG) signal 50 over time as shown in FIG. 2. The ECG signal 50 is often referred to as a PQRST waveform that is acquired using ECG electrodes and represents cardiac cell activity in the myocardium of the heart. Accordingly, the acquired data is sorted into a plurality of a gated bins based on different gated portions of a cycle of the heart defined by a plurality of gates 52 and as described in more detail below. It should be noted that although seven gates are shown, a different number of gates may be provided, such as six or eight. The gated bins define time intervals between an R+R interval, namely between the two R peaks of the PQRST waveform.

It should be noted that data arrangements other than projection data may be used in accordance with various embodiments. For example, in some imaging cameras, or acquisition modes of an imaging camera, data is collected in a "list mode", in which events are recorded sequentially together with "time stamp" or other information that may be associated with the cardiac phase. In some imaging cameras, for example multi-pinhole cameras, the data is arranged in views that are associated with pinhole location, instead of projections. Additionally, in some imaging cameras, such as moving or rotating multi-detector cameras, events may be associated with a detector head and an aim1ng direction. In accordance with some embodiments, events to be included in the reconstruction may be identified by the approximated (possibly blurred) line of sight and the cardiac phase. The reconstruction in accordance with various embodiments, for example, the methods described herein, may be adapted to the camera physical characteristics (such as collimator and detector blurring) and the data storage convention, and may include other corrections such as attenuation correction, scatter correction, etc.

Figure 3:
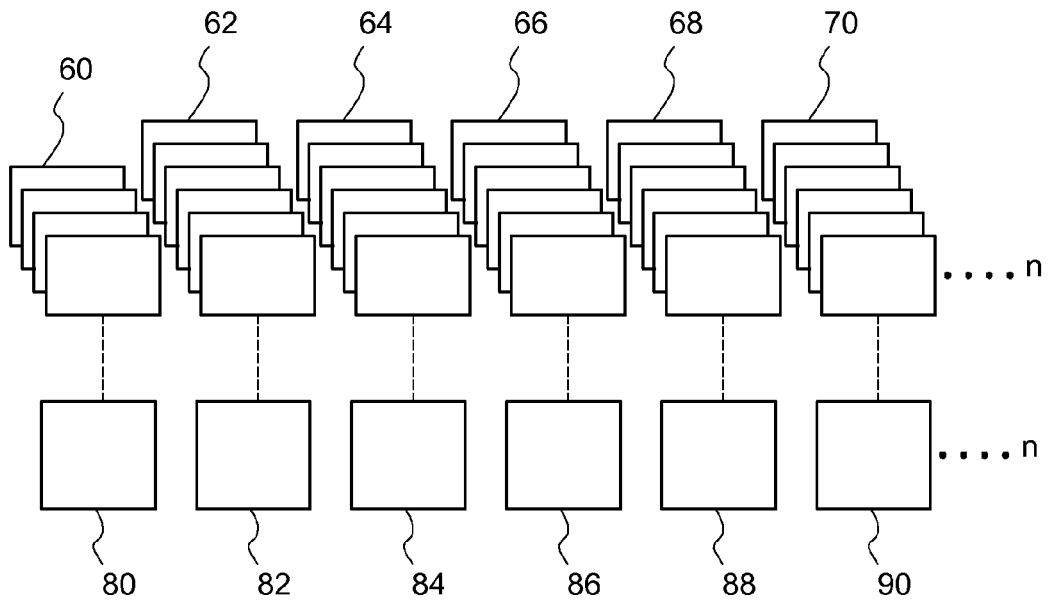
FIG. 3 is a diagram illustrating binning gated data in accordance with various embodiments.

Thus, as shown in FIG. 3, NM data for each gated interval is mapped into a plurality of cells 60, 62, 64, 66, 68, 70 . . . n using the ECG signal 50. Each of the cells corresponds to NM data acquired for the imaged heart at the particular gate interval. For example, cell 60 includes image data acquired for Gate Interval 1, cell 62 includes image data acquired for Gate Interval 2, etc. The cells may correspond to ordered projections of NM data. The cells 60, 62, 64, 66, 68, 70 are then binned in a respective bin 80, 82, 84, 86, 88, 90 . . . n. Thus, all NM data for a particular gated interval, which may be acquired over a plurality of cardiac cycles are binned in a single respective bin. Thus, each bin 80, 82, 84, 86, 88, 90 . . . n includes NM data that is associated with a plurality of cardiac cycles and corresponding to a particular phase of the heart.

The NM gated data may be acquired using different types of NM imaging systems, such as the Infinia gamma camera imaging system available from GE Healthcare. The acquired ECG signal 50 may be synchronized with acquired listmode data such that the listmode data is rebinned to generate a plurality of projections for each gated cardiac phase. For example, cardiac gated SPECT data may be provided.

Figure 4:
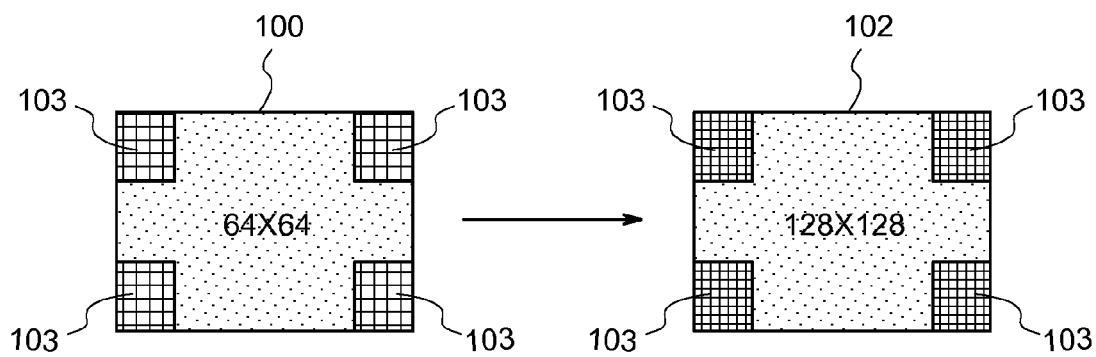
FIG. 4 is a diagram illustrating resolution recovery performed in accordance with various embodiments.

Referring again to the method 20 of FIG. 1, thereafter resolution recovery is performed on the NM data at 24. In particular, the NM data is extrapolated into a higher resolution pixel or voxel space. For example, in NM cardiac imaging where the acquired cardiac data is acquired at a lower resolution, such as 64×64 pixel projections (or 64×64×64 voxel projections), the acquired lower resolution data is extrapolated to obtain resolution recovery to a higher resolution level. In some embodiments, a non-count preserve extrapolation may be performed into a higher resolution, for example, of at least 128×128 pixel projections (or 128×128×128 voxel projections). The NM cardiac data is essentially magnified, for example, extrapolated from 6.4 millimeters (mm) per pixel to 3.2 mm per pixel. Thus, as shown in FIG. 4, the projection space 100 and the projection space 102 have the same projection slice size, however, the resolution of the projection space 102 is greater as a result of resolution recovery. Accordingly, more pixels 103 per projection space area are provided in the resolution recovered image data. It should be noted that the resolution recovery process may implement any method that increases the resolution or effectively magnifies the NM data.

Image reconstruction is thereafter performed using this higher resolution voxel space data. In particular, at 26 the resolution recovered NM data is reconstructed into three-dimensional (3D) slices, which each correspond to a particular NM data subset, which may be defined by the gated intervals. For example, in the cardiac example, NM data (which is resolution recovered) for each gated cardiac phase is separately reconstructed into 3D slices in the higher resolution space, for example, at a higher resolution of 128×128×128 voxel projections per slice. Different reconstruction algorithms or methods as are known may be used and that compensate for collimator detector response, including compensating for the distance between the patient from which the NM cardiac data was acquired and the detector that acquired the NM data. For example, compensation for collimator detector response is provided by an iterative reconstruction algorithm or process. Accordingly, an iterative based collimator-detector response compensation algorithm or method may be used during reconstruction to generate 3D SPECT images for each gate in a SPECT cardiac application.

Figure 5:
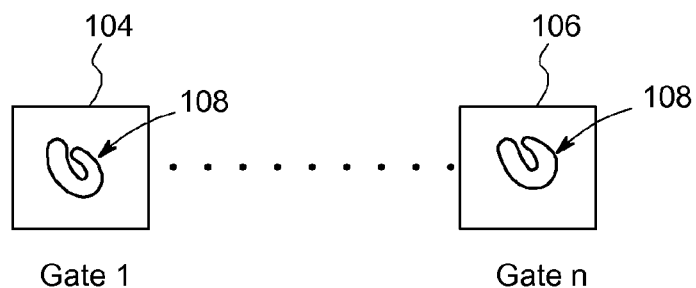
FIG. 5 is a diagram illustrating an image reconstruction process of various embodiments.

It should be noted that 3D SPECT images generated from the resolution recovered NM data have a higher image resolution (such that the images have a sharper contrast), but generally may include more noise as a result of the image magnification during the resolution recovery process. However, in various embodiments, the 3D SPECT images are not displayed to a user, but are used only for reducing blurring in the finally displayed images. It should be noted that in some embodiments, the SPECT images may be displayed to a user. As shown in FIG. 5, in a cardiac application, the images 104 and 106 within different gated bins show the heart in a slightly different phase of myocardium contraction corresponding to the gate interval for the particular phase gate (illustrated by the slightly thicker myocardium wall of a myocardium 108 at Gate n compared to Gate 1). Thus, in cardiac applications, the SPECT images may display the myocardium 108 in different phases of contraction.

In some embodiments or using imaging camera systems known in the art, raw data is collected and sometimes stored at high resolution. In these cases, resolution reduction (to lower pixel number or larger pixel size) is affected during the reconstruction process and step 24 of the method 20 may not be needed. However, according to the method 20, step 26 is performed in high resolution voxel space and without or with minimal application of low pass filtering or smoothing.

As a result of the image reconstruction, a plurality of NM images with image recovery resolution and associated with each gate are provided. It should be noted that in various embodiments no regularization or smoothing of the NM images is performed to compensate for noise in the NM images. However, in some embodiments, for example, where the NM images are displayed to a user, one of regularization or smoothing may be performed before displaying the NM images.

Figure 6:
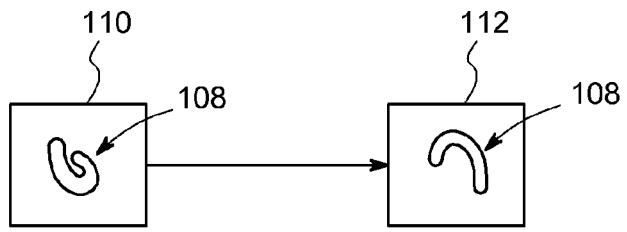
FIG. 6 is a diagram illustrating an image reformatting process of various embodiments.

The reconstructed images, and in particular, the 3D image slices are reformatted at 28, for example, to a predefined orientation or axis, such as on orientation that is typical for viewing by a user (e.g., a physician). For example, as shown in FIG. 6, a gated image 110 of the myocardium 108 may be at least one of translated or rotated to the heart primary axis, such that a short-axis view image 112 of the myocardium 108 is provided. Thus, in various embodiments the image of the myocardium 108 is reformatted to a standard view. It should be noted that the images may be modified such that the myocardium 108 may be displayed in other orientations, which may be other standard orientations along the vertical and horizontal axis. It also should be noted that in various embodiments the translation of the images of the heart center and rotation thereof is performed using summed images, namely an image formed from the sum of all the images for a particular phase gate. However, in other embodiments, the summed images are not used. Also, the same translation and/or orientation is applied to the images of each of the different gates such that the summed images for each of the phase gates has the same orientation.

Thereafter, segmentation of each gate is performed at 30 to define one or more control points that are used to register the images in the different gates as described in more detail below. For example, in a SPECT cardiac application, the images corresponding to the different gates are each segmented to define the left ventricular epicardial and endocardial surfaces on the gated SPECT images. The segmentation may be performed, for example, using different methods, including, but not limited to the methods described in Farkash G, Kenig T, Grabnic M, et al., "Volumetric Quantitation of Left Ventricular Perfusion and Function from Myocardial Perfusion SPECT: Validation of a New Algorithm" [abstract]., J Nucl Cardiol. 2006; 13 (suppl):s5-s6; and Slomka Piotr J; Nishina Hidetaka; Berman Daniel S; Kang Xingping; Akincioglu Cigdem; Friedman John D; Hayes Sean W; Aladl Usaf E; Germano Guido, "'Motion-frozen' Display and Quantification of Myocardial Perfusion", Journal of Nuclear Medicine: official publication, Society of Nuclear Medicine 2004; 45 (7):1128-34, among others. In general, any method that provides for left ventricular surface detection (LVSD) may be used.

The results of the segmentation define one or more control points that are used to register or correlate the images for further processing as described below. In particular, each of the gated images (which may be summed images) are morphed relative to a selected reference gated image at 32. For example, the gated image corresponding to the end of the heart diastole (end-diastolic bin) may be selected (e.g., Gate 1) with the images for all the other gates registered using the control points and thereafter morphed with the selected gated image. For example, each of the non-reference gated images are morphed, and in particular, the myocardium is enlarged or inflated such that the geometry of the myocardium for each of the non-end-diastolic-gated bins (i.e., non-selected gated images) substantially matches the geometry of the gated end-diastolic bin image. Accordingly, new morphed bins of cardiac images are generated with the images being compensated for cardiac contraction motion. The morphing may be provided using different methods, including, but not limited to the methods described in Kovalski G, Keidar Z, Frenkel A, Sachs J, Attia S, Azhari H., "Dual 'Motion-Frozen Heart' Combining Respiration and Contraction Compensation in Clinical Myocardial Perfusion SPECT imaging", Journal of nuclear cardiology: official publication of the American Society of Nuclear Cardiology, 2009; 16 (3):396-404, among others. In general, any image morphing method may be used that modifies a portion of an image to match a portion in another image, for example, to provide a similar geometry and 3D registration.

Figure 7:
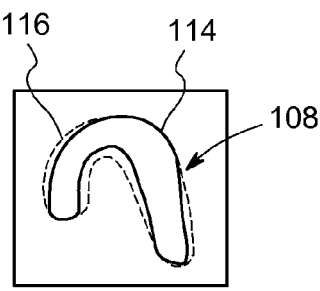
FIG. 7 is a diagram illustrating a morphing process of various embodiments.

It should be noted that the morphing may include modifications other than inflating or stretching a portion of the image, and may include any type of image resizing or image geometry matching. Thus, as shown in FIG. 7, the image of the myocardium 108 may be expanded such that portions of a defined border 114 of the myocardium (illustrated as the myocardium boundary) are inflated or stretched (generally expanded) to a border 116 (illustrated by the dashed lines) defined by the reference gated image. Accordingly, the morphing distortion may be defined by matching the shape of the myocardium in different phases.

Thereafter, each 3D slice is normalized at 34 based on the amount or magnitude of the morphing to generated normalized 3D image slices. In particular, each 3D image slice, which is a 3D volume comprised of a plurality of voxels, is normalized to the magnitude stretched or inflated during the morphing process described above. For example, in a cardiac application, the normalization compensates for the counts in each morphed 3D image slice (in particular, the 3D photon count distribution) based on the magnitude of stretching or inflation. Each of the morphed 3D image slices may be normalized by multiplying each image slice (namely multiplying the counts corresponding to each voxel) by a factor or amount equivalent to the amount of stretching that was performed. In some embodiments, the normalization uses a Jacobian operator that performs a 3D ratio of the target and reference volumes, namely the morphed 3D image slices and the non-morphed 3D image slice. Accordingly, the image normalization process results gated images each having normalized counts. Thus, in various embodiments counts are added to different the count distribution of morphed images to generate an image, for example, of the myocardium 108 that matches the image of the non-morphed reference gated image, namely having matching borders. The normalization factor in the various embodiments accounts or compensates for the volume contraction of each part of the myocardium and is applied to the data before summation.

Thereafter, all of the gated images, including all of the morphed images are summed at 36. For example, in the various embodiments, the gated images are summed by adding up all the gated images, namely the 3D volumes, voxel by voxel to generate a summed image. The summing of the gated images is accordingly performed in various embodiments on image data for all gates that are registered to each other and wherein all counts obtained during acquisition are used.

Thereafter additional or optional post processing may be performed at 38, for example, based on the particular application or desired output. The post processing may include performing noise reduction techniques using known methods. In some embodiments, the voxel size of the summed images is reduced to the original voxel size, which may be performed using the reverse of the resolution recovery process. In some embodiments, the process includes an interpolation back to the same matrix size at which the NM data was acquired. For example, the voxel size may optionally be modified to change the voxel size from 3.2 mm per voxel to 6.4 mm per voxel to be more compatible with a standard display format, such as a format with which physicians are more accustomed to viewing.

Thereafter, the morphed summed image is displayed at 40. Additionally or optionally an original summed image may be displayed. In some embodiments the morphed summed image and the original summed image are displayed side by side concurrently on a display. It should be noted that different images or information also may displayed, for example, as part of a user workstation.

Figure 8:
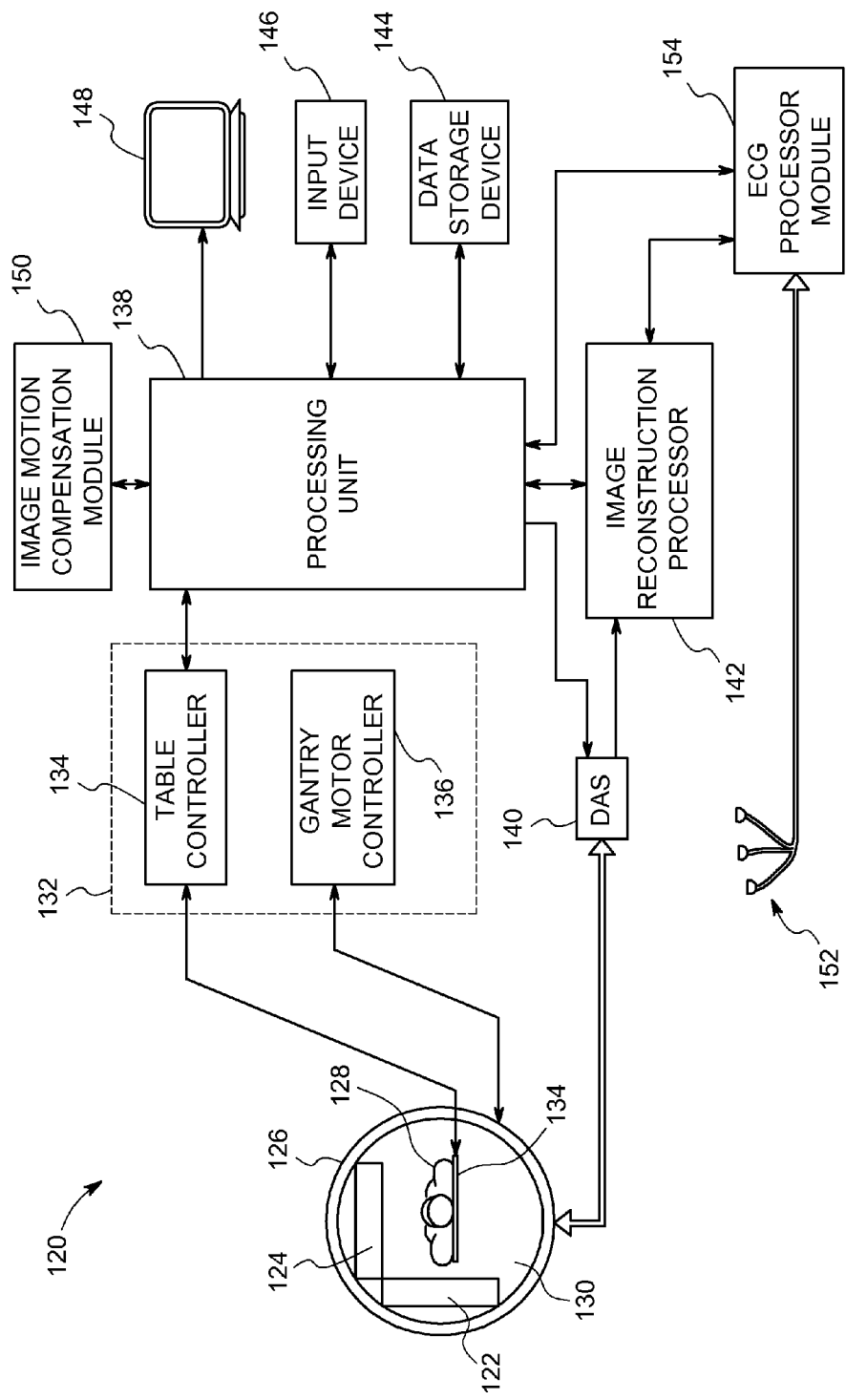
FIG. 8 is an imaging system in which various embodiments may be implemented.

The various embodiments, including the method 20 may be implemented in connection with different types of imaging systems, which may be single modality imaging systems, such as an NM imaging system or a multi-modality imaging system, such as an NM/CT imaging system. For example, as shown in FIG. 8, the imaging system 120, illustrated as an NM imaging system, may generally include a plurality of imaging detectors 122 and 124 (two are illustrated) mounted on a gantry 126. It should be noted that additional imaging detectors may be provided. The imaging detectors 122 and 124 are located at multiple positions (e.g., in an L-mode configuration) with respect to a patient 128 in a bore 130 of the gantry 126. The patient 128 is supported on a patient table 134 such that radiation or imaging data specific to a structure of interest (e.g., the heart) within the patient 128 may be acquired. It should be noted that although the imaging detectors 122 and 124 are configured for movable operation along (or about) the gantry 126, in some imaging systems, imaging detectors are fixedly coupled to the gantry 126 and in a stationary position, for example, in a PET imaging system (e.g., a ring of imaging detectors). It also should be noted that the imaging detectors 122 and 124 may be formed from different materials and provided in different configurations known in the art.

One or more collimators may be provided in front of one or more of the imaging detectors 122 and 124. The imaging detectors 122 and 124 acquire a 2D image that may be defined by the x and y location of the pixel and the location of the imaging detectors 122 and 124. Each of the imaging detectors 122 and 124 has a radiation detection face (not shown) that is directed towards, for example, the patient 128, which may be a human patient or animal. It should be noted that the gantry 126 may be configured in different shapes, for example, as a "C", "H" or "L".

A controller unit 132 may control the movement and positioning of the patient table 134 with respect to the imaging detectors 122 and 124 and the movement and positioning of the imaging detectors 122 and 124 with respect to the patient 128 to position the desired anatomy of the patient 128 within the FOVs of the imaging detectors 122 and 124, which may be performed prior to acquiring an image of the anatomy of interest. The controller unit 132 may have a table controller 134 and a gantry motor controller 136 that each may be automatically commanded by a processing unit 138, manually controlled by an operator, or a combination thereof. The table controller 134 may move the patient table 134 to position the patient 128 relative to the FOV of the imaging detectors 122 and 124. Additionally, or optionally, the imaging detectors 122 and 124 maybe be moved, positioned or oriented relative to the patient 128 or rotated about the patient 128 under the control of the gantry motor controller 136.

The imaging data may be combined and reconstructed into an image compensated composite image as described herein, which may comprise two-dimensional (2D) images, a three-dimensional (3D) volume or a 3D volume over time (4D).

A Data Acquisition System (DAS) 140 receives analog and/or digital electrical signal data produced by the imaging detectors 122 and 124 and decodes the data for subsequent processing as described in more detail herein. An image reconstruction processor 142 receives the data from the DAS 140 and reconstructs an image using any reconstruction process known in the art. A data storage device 144 may be provided to store data from the DAS 140 or reconstructed image data. An input device 146 also may be provided to receive user inputs and a display 148 may be provided to display reconstructed images.

Additionally, ECG leads 152 (or other cardiac activity sensors) are joined to the patient 128 to detect cardiac activity. The leads 128 generate ECG signals that are digitized, processed, filtered and the like, by an ECG processor module 154, which allows, for example, the acquisition of gated cardiac NM data. The ECG processor module 154 may provide the ECG signals to the processing unit 138 and/or to the image reconstruction processor 142. Alternatively, the ECG processor module 142 may process the ECG signals and output to the processing unit 138 and/or to the image reconstruction processor 142 time stamps associated with particular points in the cardiac cycle. The processing unit 138 and/or the image reconstruction processor 142 associates the time stamps or ECG signals with corresponding projection data sets to identify the cardiac activity at the time at which an associated projection data set is obtain. Alternatively, one of the processing unit 138 and/or to the image reconstruction processor 142 may generate, based on the ECG signal, a time stamp.

The time stamps identify a unique point in the cardiac cycle (e.g. the R-wave, the P-wave, X milliseconds following the R-wave and the like). The processing unit 138 and/or to the image reconstruction processor 142 stores the time stamp with, or uniquely correlates the time stamp to, a corresponding projection data set. Thus, each projection data set is associated with a particular table position and gantry rotation angle, as well as a particular point in the cardiac cycle, at which the projection data set was acquired. Each time stamp and corresponding projection data set may be stored in the data storage device 144. The data storage device 144 may store a group of projection data sets for a complete scan or examination of the patient 128 or a region or organ or interest of the patient 128. The group of projection data sets corresponds to a volumetric area of the patient 128.

In operation, when a photon having energy typical of the energies of photons used in SPECT, CT or PET applications is incident on the imaging detectors 122 and 124, the radiation is detected and recorded as a count once validated using known validation methods. This information is then used to reconstruct an image, for example, using the image reconstruction processor 142, and which may be gated NM images. Moreover, an image motion compensation module 150 may be provided to correct or compensate for motion of an imaged object, which may result in image blurring, and that may be caused, for example, in cardiac imaging from heart motion. The image motion compensation module 150 reduces or compensates for image blurring caused by motion as described in more detail herein, for example, in connection with the method 20 illustrated in FIG. 1. The image motion compensation module 150 may be a separate module or may be provided as part of the processing unit 138. The image motion compensation module 150 may be implemented in hardware, software, or a combination thereof.

Thus, various embodiments reduce image blurring, particularly in NM images. Image blurring is reduced by compensating for image motion, such as heart motion in cardiac applications. A resolution recovery process along with morphing and normalization of gated images is performed to generate images that account for image movement, such as volume contraction of the myocardium in cardiac applications.

The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a floppy disk drive, optical disk drive, and the like. The storage device may also be other similar means for loading computer programs or other instructions into the computer or processor. According to various embodiments, while data acquisition may be performed by an NM camera, some or all of the data processing may be performed on a locally or remotely located processing station.

As used herein, the term "computer" or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method for compensating for motion in an imaged object, the method comprising:
   obtaining nuclear medicine (NM) image data for an object acquired from an NM imaging system, the NM image data including single photon emission computed tomography (SPECT) image data;
   performing resolution recovery on the NM image data;
   reconstructing the resolution recovered NM image data into a plurality of subsets;
   morphing the reconstructed NM image data in at least one of the plurality of subsets, wherein the plurality of subsets of reconstructed NM image data correspond to NM images of gated phases of a cardiac cycle and the morphing comprises registering the NM images in different subsets to a selected gated NM image in one of the subsets by modifying a portion of the NM images to match a portion of the selected gated NM image to provide a similar geometry and registration;
   normalizing the NM image data based on a magnitude of the morphing; and
   summing the NM image data to generate an NM image compensated for motion of the object.

2. A method in accordance with claim 1 wherein the gating information corresponds to cardiac gates determined from electrocardiogram (ECG) information.

3. A method in accordance with claim 1 wherein performing resolution recovery comprises extrapolating the NM data into a higher resolution image space.

4. A method in accordance with claim 1 wherein the reconstruction comprises compensating for a detector response of the NM imaging system.

5. A method in accordance with claim 1 further comprising reformatting the reconstructed NM images in each of the plurality of subsets to a common axis.

6. A method in accordance with claim 1 further comprising defining image boundary control points based on the segmentation for use in the morphing.

7. A method in accordance with claim 1 wherein the morphing comprises selecting a subset of NM image data as a reference subset and stretching the NM image data in the other subsets to match the reference subset.

8. A method in accordance with claim 7 wherein the reference subset is an end diastole gated subset.

9. A method in accordance with claim 1 wherein the normalizing comprises adjusting a photon count based on the magnitude of the morphing.

10. A method in accordance with claim 1 further comprising reducing a resolution of the summed NM images to a resolution prior to performing the resolution recovery.

11. A method in accordance with claim 1 wherein performing resolution recovering comprises increasing a voxel size of the NM image data.

12. A method in accordance with claim 1 wherein the object comprises a heart and the morphing comprises matching myocardium shapes of the heart in different cardiac phases.

13. A method in accordance with claim 1 wherein the object comprises a heart and the normalizing comprises applying a normalization factor that compensates for volume contraction of a myocardium of the heart, and wherein the normalization factor is applied prior to the summing.

14. A method in accordance with claim 1 further comprising displaying the summed NM image concurrently with an NM image generated from the obtained NM image data.

15. A method in accordance with claim 1, wherein the morphing comprises using a plurality of control points in the NM images to register the NM images in different subsets to the selected gated NM image in one of the subsets.

16. A method in accordance with claim 1, wherein the NM images comprises images of a myocardium and the modifying comprises resizing the NM images of the myocardium to match the selected gated NM image of the myocardium.

17. A method in accordance with claim 1, wherein the modifying comprises expanding a border of the NM images of the myocardium to match a border of the selected gated NM image of the myocardium.

18. A method in accordance with claim 1, wherein the modifying comprises one of image resizing or image geometry matching.

19. A method in accordance with claim 1, wherein the modifying comprises one of inflating or stretching.

20. A method in accordance with claim 1, wherein the NM images comprise three-dimensional (3D) image slices and the normalizing comprises normalizing to a magnitude of the inflating or stretching.

21. A method in accordance with claim 1, wherein the normalizing comprises compensating for counts in each of the morphed NM images based on a magnitude of the morphing by multiplying each of the NM images by a factor corresponding to an amount of the modifying.

22. A method for reducing blurring in nuclear medicine (NM) cardiac images, the method comprising:
   obtaining gated NM cardiac images including photon count information, the NM cardiac images including cardiac single photon emission computed tomography (SPECT) data;
   morphing a count distribution of a plurality of phases of the gated NM cardiac images into a location of a selected one of the plurality of phases;
   applying a normalization factor to the morphed gated NM cardiac images, the normalization factor based on an amount of heart contraction; and
   summing the normalized gated NM cardiac images to generate an image of a heart having reduced blurring.

23. A method in accordance with claim 22 wherein the selected one of the plurality of phases comprises an end diastole phase of the heart.

24. A method in accordance with claim 22 wherein the morphing comprises matching myocardium shapes of the heart in each of the plurality if phases.

25. A method in accordance with claim 22 further comprising extrapolating the gated NM cardiac images to generated resolution recovered NM images prior to morphing.

26. An imaging system comprising:
   a gantry having at least one imaging detector configured to acquire nuclear medicine (NM) image data of a patient including single photon emission computed tomography (SPECT) image data;
   an electrocardiogram (ECG) processor module configured to acquired ECG gating information corresponding to the acquired NM image data of the patient; and
   an image motion compensation module configured to morph the NM image data for each of a plurality of gates using resolution recovered image data, wherein the resolution recovered image data is reconstructed into a plurality of subsets, the plurality of subsets corresponding to NM images of gated phases of a cardiac cycle, and the image motion compensation module is further configured to normalize the NM image data based on a magnitude of the morphing and register the NM image data in different subsets to a selected gated NM image in one of the subsets by modifying a portion of the NM images to match a portion of the selected gated NM image to provide a similar geometry and registration.

* * * * *